Patented Dec. 23, 1941

2,267,257

UNITED STATES PATENT OFFICE 2,267,257

PROCESS FOR THE MANUFACTURE OF ACETYLENE DERIVATIVES OF THE CYCLO-PENTANO - POLYHYDROPHENANTHRENE SERIES

Leopold Ruzicka, Zurich, Switzerland, assignor, by mesne assignments, to Ciba Pharmaceutical Products, Incorporated, Summit, N. J., a corporation of New Jersey No Drawing. Application June 21, 1938, Serial No. 215,055. In Switzerland June 26, 1937

8 Claims. (Cl. 260—397.5)

It is known that by the action of acetylenes on ketones of the cyclo-pentano-polyhydrophenanthrene series in presence of an alkali metal or of an alkali amide or an alkali alcoholate, acetylene derivatives can be produced. The yield by this process, however, is small, since a large part of the material is resinified.

This invention relates to a process by which surprisingly good yields of acetylene derivatives of the cyclopentano-polyhydrophenanthrene series may be obtained by treating a ketone or an aldehyde of this series with a metal salt of the acetylene or mono-substituted acetylene in a homogeneous phase, for example in presence of ammonia and/or an amine, a tertiary alcohol or the like, and if desired of a further solvent, then hydrolizing the metalliferous addition product or treating it with an alkylating agent or an acylating agent, and then purifying, if desired, the acetylene derivative produced and also, if desired, esterifying or etherifying hydroxyl groups therein.

In this manner merely a small proportion of unchanged parent material is recovered in addition to the reaction product formed almost quantitatively; there is no noticeable resinification.

Suitable parent materials are both saturated and unsaturated ketones or aldehydes of the cyclopentano-polyhydrophenanthrene series, for instance androstanolones, such as androsterones or dihydrotestosterones, further androstenolones, for instance dehydro-androsterones, further androstane-diones, androstene-diones, etio-cholenyl-17-aldehydes, oestrone, hexahydro-oestrone, equiline, pregnanolones, pregnenolones, pregnane-diones, pregnene-diones, compounds of the suprarenal cortical hormone series, cholestanone, cholestenone, and analogous ketones of the sterol series or derivatives of the above compounds, such as esters, ethers, mono-enol derivatives of diketones or the like.

Suitable metal salts for use in the invention are, for example, sodium, potassium, rubidium, caesium, lithium, silver or copper salts of the acetylene or mono-substituted acetylenes, for instance of phenyl acetylene, of acetylene carboxylic acids, for instance acetylene acetic acid, acetylene propionic acids, acetylene butyric acids, acetylene malonic acid or derivatives of these, such as salts, esters, amides or the like. Such acetylene carboxylic acids or their derivatives may be obtained, for example, in a simple manner by the reaction of an acetylene salt with a halogen carboxylic acid derivative. The reaction of the metal acetylides with the ketones or the aldehydes occurs in accordance with this invention in a homogeneous phase, for example in presence of ammonia (for instance pure liquid ammonia) and/or of an amine, for instance aniline, an alkylated aniline, pyridine, piperidine, quinoline, or the like, or in the presence of a tertiary alcohol, for instance tertiary butyl alcohol or tertiary amyl alcohol or the like, and, if desired, in the presence of a further solvent, such as ether, an aromatic hydrocarbon or the like. Previously prepared solutions or suspensions of the metal acetylide may be used, such as can be obtained, for instance, by conducting acetylene into a solution of an alkali metal or an alkali amide, in anhydrous ammonia, or in an aforesaid alcohol or by introducing an alkali metal or an alkali amide into a solution of acetylene in anhydrous ammonia or in a tertiary alcohol. Alternatively, the ketones or the aldehydes of the cyclopentano-polyhydrophenanthrene series may be present from the beginning in the solution for reaction, so that a reaction occurs, in the mass of the metal acetylide formed.

The addition product produced, which is of the formula

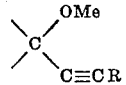

wherein R is hydrogen or a substituted or non-substituted hydrocarbon or carboxyl group, may, after the separation from the mixture or even in the mixture itself, be hydrolysed, for example by means of water or acid, to a secondary or tertiary alcohol of the acetylene series.

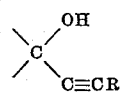

Alternatively, the metalliferous addition compound may be caused to react with an alkylating agent so as to produce an ether of the acetylene series of the formula

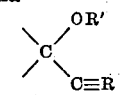

in which $R_1$ is a substituted or non-substituted hydrocarbon residue. The expression "alkylating agent" includes here arylating agents and alkarylating agents, so that, for example, there may be used alkyl halides or alkylene halides, for instance methyl iodide, propyl iodide, vinyl bromide, allyl bromide, benzyl bromide, chloromethyl ether, triarylmethyl chloride, also reactive esters of alcohols, for instance dialkyl sulfates or the like. Instead of hydrolizing or alkylating agents there may be used acylating agents for instance acid halides (like acetyl chloride, propionyl chloride, benzyl chloride, toluene sulfo-chloride, chlorocarbonic acid esters, chloroformic acid esters) or acid anhydrides for the reaction, whereby the corresponding esters of the acetylene series are obtained.

If desired, the products of the invention are purified. This may happen, in case a monosubstituted acetylene is in question, by means of the silver or copper salt, or unchanged parent material may be removed by means of a ketone reagent. The purification is in general quite simple, owing to the almost quantitative course of the reaction.

Finally, free hydroxyl groups still present may be esterified or etherified in known manner.

The acetylene derivatives of the cyclopentano-polyhydrophenanthrene series are therapeutically valuable compounds and are also applicable as intermediate products for making thereapeutical compounds.

The following examples illustrate the invention, the parts being by weight:

Example 1

In a spherical flask cooled with acetone and carbonic acid snow are dissolved 1.2 parts of potassium in about 50 parts of liquid ammonia. Into the deep blue solution acetylene is conducted until the liquid is fully decolorized, and there is then added, while stirring, a solution of 1 part of trans-dehydro-androsterone in 5 parts of dry benzene and 50 parts of dry ether. The flask is then removed from the cooling mixture and the contents are further stirred for 12 hours at room temperature. Ice is then added and the ethereal solution is washed several times with water, then dried over sodium sulfate and evaporated in a vacuum. From the crystallized residue the unchanged trans-dehydro-androsterone is extracted in the usual manner by means of halide of the trimethyl-amino-acetic acid hydrazide.

The portion that does not react is recrystallized from much mixture of ether and pentane and there is thus obtained pure $\Delta^{5:6}$-17-ethinyl-androstene-diol-(3:17) of melting point 240–242° C. The yield is over 80 per cent.

By acetylating this compound with acetic anhydride in pyridine at room temperature, there is obtained the 3-mono-acetate of $\Delta^{5:6}$-17-ethinyl-androstene-diol-(3:17) of melting point 175–176° C.

Example 2

Trans-androsterone is condensed with acetylene in the manner described in Example 1. After a working-up following exactly that described in Example 1 there is obtained the 17-ethinyl-androstane-diol-(3:17) of melting point 255–257° C. The yield is over 80 per cent.

By acetylation with acetic anhydride and pyridine at room temperature this product yields a 3-mono-acetate melting at 205–207° C.

Example 3

1 part of the $\Delta^{5:6}$-17-ethinyl-androstene-diol-(3:17) of melting point 240–242° C. is heated to boiling together with 6 parts of pyridine and 6 parts of acetic anhydride for 20 hours under reflux. The whole is then evaporated to dryness in a vacuum, the residue is taken up with ether; the ethereal solution is filtered and washed with dilute hydrochloric acid, dilute sodium carbonate solution and water. The dried ethereal solution is then evaporated and the residue is crystallized from hexane after addition of some active carbon. The $\Delta^{5:6}$-17-ethinyl-androstene-diol-(3:17)-diacetate obtained in a yield of about 90 per cent melts at 169–169.5° C.

In like manner the 17-ethinyl-androstane-diol obtained as described in Example 2 may be converted into the $\Delta^{5:6}$-17-ethinyl-androstane-diol-diacetate which melts at 200° C. and may be recrystallized from hexane.

Example 4

In a spherical flask cooled with acetone and carbonic acid snow is dissolved 0.23 part of sodium in about 10 parts of liquid ammonia. There is added a solution of 1.26 parts of 1-ethinyl-propionic acid ethyl ester in 5 parts of absolute ether and then a solution of 2.88 parts of trans-dehydroandrosterone in a mixture of 5 parts of benzene and 50 parts of absolute ether. The ammonia is now allowed to evaporate and the mixture is stirred for 24 hours at room temperature and then mixed with water; the ethereal solution is washed with dilute hydrochloric acid, dilute sodium carbonate solution and water, and then dried and evaporated. The residue is treated for removing unchanged trans-dehydroandrosterone in the usual manner with an acetic acid solution of the chloride of trimethylammonium acetic hydrazide. There is thus obtained a condensation product of trans-dehydro-androsterone with 1-ethinyl-propionic acid ethyl ester of the formula

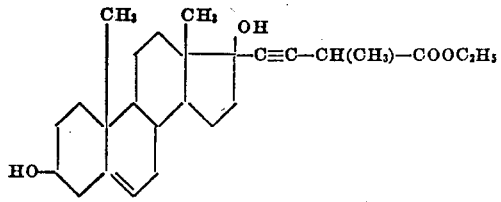

The 1-ethinyl-propionic acid ethyl ester used above may be made, for example, as follows:

In a spherical flask cooled with acetone and carbonic acid snow are dissolved 2.3 parts of sodium in 50 parts of liquid ammonia. Into the blue solution acetylene is passed until the solution is completely decolorized. There is then added, while stirring, 50 parts of absolute benzene, and the flask is removed from the cooling bath and the ammonia is allowed to evaporate. The last residue of ammonia is removed by evacuation. There is now added a solution of 18 parts of α-bromopropionic acid ethyl ester in 50 parts of benzene and the mixture is stirred for 16 hours at room temperature. At the finish the whole is heated on the water bath for 2 hours and the liquid is filtered from the precipitated sodium bromide and fractionally distilled. The 1-ethinyl-propionic acid ethyl ester boils at 160° C.

Example 5

In a spherical flask cooled to —20° C., 200 parts of dry ether are saturated with acetylene and the solution obtained is mixed gradually, while stirring and passing acetylene through it, with a solution of 4 parts of potassium in 100 parts of tertiary butyl alcohol. There is then run in, in the course of 2 hours, 2.3 parts of trans-dehydroandrosterone dissolved in 200 parts of ether, and stirring is continued, while passing in acetylene, for 12 hours. The mixture is then decomposed by addition of an ice-cooled saturated ammonium chloride solution, and the product is worked up as usual. From the residue left by expulsion of the solvent unchanged trans-dehydro-androsterone is removed in the usual manner by means of a ketone reagent, and there is left in very good yield $\Delta^{5:6}$-17- ethinyl-androstene-diol-(3:17) of melting point 240–242° C.

*Example 6*

2.3 parts of trans-androsterone are caused to react with acetylene in the manner described in Example 5. After the recrystallisation from a mixture of ether and pentane there is obtained in a yield of over 80 per cent 17-ethinyl-endrostane-diol-(3:17) of melting point 255–257° C.

*Example 7*

About 25 parts of potassium are dissolved in about 850 parts of liquid ammonia (cooled with dry ice and acetone) and acetylene is introduced into this solution until the blue color has disappeared (after about 3 hours). A solution or suspension of 10 parts of estrone in 350 parts of dioxane and 150 parts of benzene is then added to this mixture. The freezing mixture is removed, the reaction solution is allowed to stand for about 2 hours and stirring is continued over-night. The latter is then mixed with ice and water, acidified with sulfuric acid until the reaction is congo acid, and the solution is shaken five times with ether. The combined ethereal extracts are washed with water, sodium carbonate solution of 5 per cent. strength and then again with water, until the washing water is neutral. The ether is then evaporated, the residue dissolved in little methanol and diluted with water. The separated product is recrystallized from aqueous methanol. The yield amounts to about 80 per cent. The 17-ethinyl-estradiol-(3:17) thus obtained melts at 144–145° C.

The corresponding diacetate is obtained by heating the above ethinyl-estradiol with pyridine and acetic anhydride. After recrystallization from aqueous methanol it melts at 68–70° C. In quite analogous manner there is also obtained for example the 17-ethinyl-dihydro-equilenine of melting point 180° C. and the 17-ethinyl-dihydro-equiline of melting point 182° C.

In analogous manner there may also be produced other esters, ethers, glucosides and the like of this and other analogously constructed compounds of the cyclopentano-polyhydrophenanthrene series.

As starting materials there may be used just as well other carbonyl compounds of the cyclopentano-polyhydrophenanthrene series, such as have been mentioned in the 4th paragraph of the specification.

What I claim is:

1. A process for the manufacture of acetylene derivatives of the cyclopentano-polyhydrophenanthrene series, comprising reacting, in a homogeneous medium, a carbonyl compound of this series with a salt of an acetylene, derived from a metal of group I of the periodic system.

2. A process for the manufacture of acetylene derivatives of the cyclopentano-polyhydrophenanthrene series, comprising reacting, in a homogeneous medium, a ketone of this series with a salt of an acetylene, derived from a metal of group I of the periodic system.

3. A process for the manufacture of $\Delta^{5:6}$-17-ethinyl-androstenediol-(3:17), comprising reacting, in a homogeneous medium, trans-dehydroandrosterone with a salt of acetylene, derived from a metal of group I of the periodic system, and hydrolizing the intermediately formed metalliferous addition product.

4. A process for the manufacture of $\Delta^{5:6}$-17-ethinyl-androstenediol-(3:17), comprising reacting, in a homogeneous medium in presence of ammonia, trans-dehydro-androsterone with a salt of acetylene, derived from a metal of group I of the periodic system, and hydrolizing the intermediately formed metalliferous addition product.

5. A process for the manufacture of $\Delta^{5:6}$-17-ethinyl-androstenediol-(3:17), comprising reacting, in a homogeneous medium in presence of ammonia, trans-dehydro-androsterone with the potassium salt of acetylene and hydrolizing the intermediately formed metalliferous addition product.

6. A process for the manufacture of 17-ethinyl-estradiol-(3:17), comprising reacting, in a homogeneous medium, estrene with a salt of acetylene, derived from a metal of group I of the periodic system, and hydrolizing the intermediately formed metalliferous addition product.

7. A process for the manufacture of 17-ethinyl-estradiol-(3:17), comprising reacting in a homogeneous medium in presence of ammonia, estrone with a salt of acetylene, derived from a metal of group I of the periodic system, and hydrolizing the intermediately formed metalliferous addition product.

8. A process for the manufacture of 17-ethinyl-estradiol-(3:17), comprising reacting, in a homogeneous medium in presence of ammonia, estrone with the potassium salt of acetylene and hydrolizing the intermediately formed metalliferous addition prtoduct.

LEOPOLD RUZICKA.